United States Patent
Salzer et al.

(10) Patent No.: US 6,895,596 B1
(45) Date of Patent: May 17, 2005

(54) CIRCUIT AND METHOD FOR INTERLEAVING A DATA STREAM

(75) Inventors: William E. Salzer, Gilbert, AZ (US); Mary E. Gallagher, Phoenix, AZ (US); Patrick J. O'Malley, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 08/997,622

(22) Filed: Dec. 23, 1997

(51) Int. Cl.[7] ................................................ H04N 7/16
(52) U.S. Cl. .................. 725/142; 725/139; 725/151; 386/97; 386/99; 370/537; 348/481; 348/485
(58) Field of Search ................................. 725/142, 139, 725/151; 386/97, 99, 98, 39, 104–106; 381/2, 77, 60, 81, 80; 348/481, 485, 462, 480, 461, 484; 370/537, 540, 448; H04N 7/00, 11/00, 7/06, 7/064, 7/087

(56) References Cited

U.S. PATENT DOCUMENTS

| | | | | |
|---|---|---|---|---|
| 4,694,426 A | * | 9/1987 | Mason | 365/78 |
| 4,852,090 A | * | 7/1989 | Borth | 370/347 |
| 5,781,480 A | * | 7/1998 | Nogle et al. | 365/189 |

* cited by examiner

Primary Examiner—Vivek Srivastava

(57) ABSTRACT

A circuit and method of interleaving a data stream (DATA) in which the data to be interleaved is contained in separate sections of the data stream. A buffer storage circuit (28) receives and stores the data stream. A first section (T1–T2) of the data stream is transferred to a first memory circuit (62) and a second section (T3–T5) of the data stream is transferred to a second memory circuit (64). A multiplexer circuit (68) receives data from the first and second memory circuits and selects between the first and second sections of the data stream in response to a selection signal to produce an interleaved output signal.

10 Claims, 1 Drawing Sheet

FIG. 1
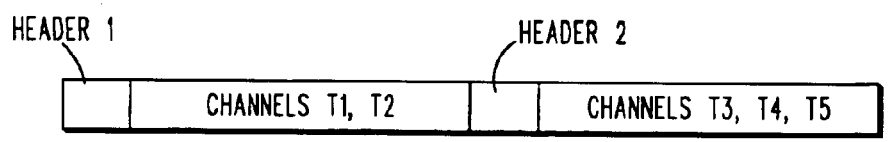
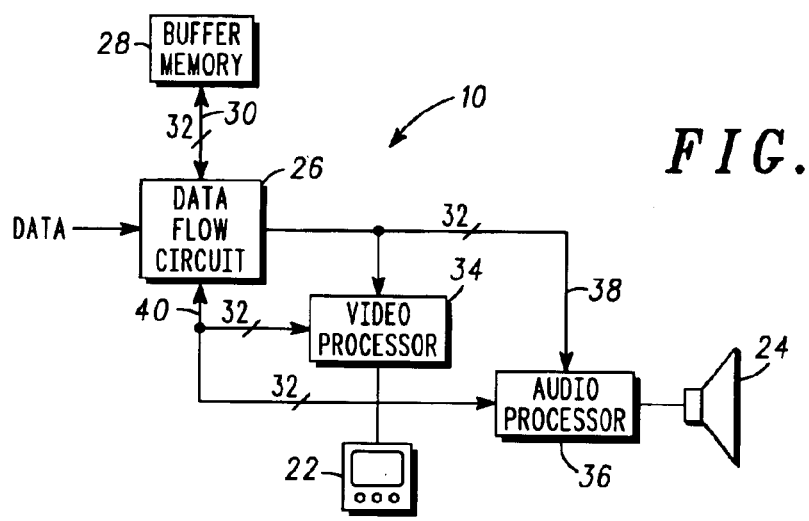
FIG. 2
FIG. 3
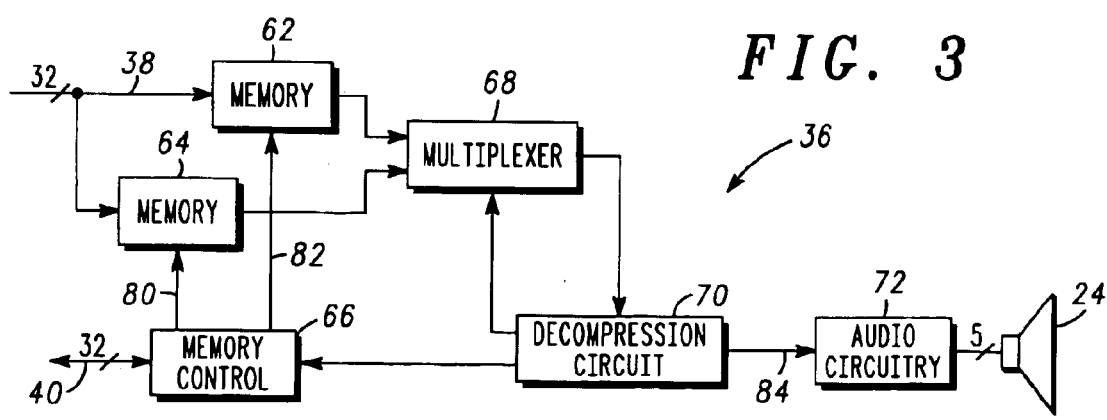

CIRCUIT AND METHOD FOR INTERLEAVING A DATA STREAM

BACKGROUND OF THE INVENTION

The present invention relates in general to integrated circuits, and more particularly to integrated circuits for interleaving data contained in different sections of a multimedia data stream.

Digital Versatile Disks and other devices are frequently used to store video and audio, i.e., multimedia, data for displaying on a monitor or driving speakers. The multimedia sounds and images typically are intended to be produced at the same time, but the data used to generate them may be provided serially.

Therefore, it is often necessary to interleave data contained in different sections of the serial data stream to allow the different sections to be processed together. For example, in the multimedia formatting standard known as the Motion Picture Expert's Group 1 (MPEG-1) standard, the audio portion includes data for two audio channels, i.e., stereo, which are interleaved within each frame of the incoming data stream and can readily be processed together. An extension of MPEG-1 referred to as the MPEG-2 standard expands this concept to include additional channels of surround sound capability to provide up to eight channels of audio data. To ensure backward compatibility with the earlier MPEG-1 standard, MPEG-2 provides stereo data within one section of the data stream and surround sound data within a different section which is received later.

Prior art audio processing circuits use a large memory circuit with up to 26,000 memory cells to store the audio data stream from the stereo section up to and including the surround sound data. To avoid interrupting the output signal due to data not being available, the memory circuit is configured as a dual port memory which can be written to and read from simultaneously. However, such dual port memories consume a large die area on an integrated circuit and therefore increase the manufacturing cost of the processing circuit.

Hence, there is a need for an improved circuit and method of retaining data from one section of a multimedia signal so that the data can be processed together with data from another section that is received later in a serial data stream.

BRIEF DESCRIPTION OF THE DRAWINGS

FIG. 1 is a diagram of a frame of MPEG-2 audio data;

FIG. 2 is a block diagram of a multimedia data processing circuit; and

FIG. 3 is a block diagram of an audio processor.

DETAILED DESCRIPTION OF THE DRAWINGS

A simplified frame of a typical audio portion of an MPEG-2 data stream is shown in FIG. 1, including a stereo section containing control information in HEADER 1 along with stereo data for stereo CHANNELS T1 and T2. The stereo section is followed by a surround sound section containing control information in HEADER 2 along with surround sound data for CHANNELS T3, T4 and T5. Because the stereo and surround sound output signals are intended to be heard at the same time, they must be processed together, even though surround sound data is received later than stereo data. Moreover, the processing must occur continuously and without pauses to provide high quality audio output signals to drive the speakers or other output devices.

FIG. 2 is a block diagram of a multimedia data processing circuit 10 for converting a multimedia data stream DATA to a video signal for driving a monitor 22 or other display device, and an audio signal for driving a speaker 24 or other audio device. To simplify the description, data processing circuit 10 is shown as having one speaker, although there typically is one speaker for each channel of audio data produced by data processing circuit 10. DATA is compressed and formatted in accordance with the Motion Picture Expert's Group 2 (MPEG-2) standard as shown in FIG. 1.

Multimedia data processing circuit 10 includes a data flow circuit 26 which receives DATA in serial fashion on a 32-bit input bus 30 from a Digital Versatile Disk or other input device. DATA is sorted into video and audio portions which are stored in serial fashion in separate regions of a buffer storage circuit 28, which includes a large dynamic random access memory (DRAM) to store several frames of data. Data flow circuit 26 tracks the locations of the video and audio regions with pointers to control and monitor transfers of DATA on a 32-bit data bus 38 in response to memory requests from a video processor 34 and an audio processor 36 sent on a control bus 40.

Video processor 34 receives the video portion of DATA from buffer storage circuit 28 on a thirty-two bit bus 38 for decompressing and other video processing such as color correction, pixel interpolation, etc. Where the monitor is configured to receive an analog video signal, video processor 34 includes circuitry to convert the digital video data to an analog video signal and to amplify the analog video signal.

As video data is processed and the video image is displayed on monitor 22, a request for new data is sent to data flow circuit 26 on bus 40. However, data-flow circuit 26, buffer storage circuit 28 and bus 38 are not always available to respond to such requests immediately to ensure a continuous and uninterrupted supply of video data to video processor 34. For example, data flow circuit 26 and/or bus 38 may be busy performing other system tasks such as receiving new DATA, transferring audio data to audio processor 36 or communicating with other system devices (not shown) coupled to bus 38. To avoid interruptions in the video output signal that drives monitor 22, video processor 34 includes local memory to absorb such periods when data is not immediately available to allow video processing to continue for a time.

Similarly, audio processor 36 decompresses the audio portion of DATA received from data flow circuit 26 on bus 38. Audio data is formatted to include surround sound audio channels, so audio processor 36 interleaves stereo channels T1–T2 with surround sound channels T3–T5 to drive speaker(s) 24. Audio processor 34 includes circuitry to perform a digital-to-analog conversion on the audio data and to amplify and filter the converted analog audio signal if necessary.

As audio data is processed, audio processor 36 issues a request for new data to data flow circuit 26 on control bus 40. As is the case with video data, if data flow circuit 26 and/or bus 38 are occupied with other system tasks, new audio data often is not immediately transferred on demand. To ensure that speaker 24 is driven with an uninterrupted audio signal, audio processor 36 includes local memory to store enough audio data to ensure continuous processing for the periods when data flow circuit 26 and bus 38 are unavailable to transfer new audio data.

While data for one circuit is being transferred so that data flow circuit 26, buffer storage circuit 28 or bus 38 are busy, other circuits must wait until the transfer is complete. Hence, the size of the local memory in video processor 34 and audio processor 36 is determined by the amount of data transferred to other circuits. To reduce wait states, local memory typically is configured as dual port random access memory. However, dual port random access memory consumes a large area on an integrated circuit die and consequently increases system cost, so it is desirable to either reduce the size of data transfers or to reduce the amount of local memory needed to absorb the wait states.

FIG. 3 is a schematic diagram showing further detail of audio processor 34 for decoding and processing audio data received on bus 38 to produce a continuous audio signal to drive speaker 24. Audio processor 34 includes memory circuits 62 and 64, a memory control circuit 66, a multiplexer 68, a decompression circuit 70 and audio circuitry 72.

Memory circuits 62 and 64 are configured as dual port memories capable of providing stored data to their respective outputs while receiving and writing new data from bus 38. Memory circuits 62 and 64 have adequate storage capacity to absorb the worst case wait states, i.e., to retain enough data to ensure continuous audio processing while waiting for new audio data to be received. Stereo data (T1–T2) from buffer storage circuit 28 is routed through memory circuit 62 and surround sound data (T3–T5) is routed through memory circuit 64. Since this data is available in buffer storage circuit 28, it can be transferred in small packets as it is processed, rather than as a complete frame. By using two memory circuits 62 and 64 and avoiding the need to store an entire frame of audio data, the present invention can use smaller memory circuits than the prior art.

For example, in the described embodiment, memory circuits 62 and 64 include about 1,000 bits of storage capacity, a significant reduction from the 26,000 bits needed by the prior art. The smaller memory size significantly reduces die area and circuit manufacturing cost.

Memory control circuit 66 controls data transfers into and out of memory circuits 62 and 64 with read/write lines 80 and 82. Memory control circuit 66 includes a pointer to monitor the amount of stereo data currently stored in memory circuit 62, which is incremented when new stereo data is received and decremented when data is provided at the output of memory circuit 62 and selected through multiplexer 68. A similar surround sound pointer tracks the amount of surround sound data currently being stored in memory circuit 64. The surround sound pointer increments and decrements when surround sound data is transferred into or out of memory circuit 64, respectively. When the amount of data stored in memory circuits 62 or 64 falls below a predetermined level, memory control circuit 66 sends a request on bus 40 to data flow circuit 26 for new stereo or surround sound data.

Multiplexer 68 selects between memory circuit 62 and memory circuit 64 in response to a selection signal from decompression circuit 70 to produce an interleaved signal at its output. By way of example, suppose that decompression circuit 70 needs a packet of T1–T2 data followed by a packet of T3–T5 data to decompress the audio data stream. Decompression circuit 70 produces a first selection signal at the control input of multiplexer 68 to route a T1–T2 packet stored in memory 62 to the output of multiplexer 68. Decompression circuit 70 then produces a second selection signal to route a T3–T5 packet stored in memory 62 to the output of multiplexer 68 in a sequence T1–T2, T3–T5, etc. Hence, a T1–T2 packet is interleaved with a T3–T5 packet.

Stereo and surround sound data typically are selected and decompressed in packets according to the algorithm used in decompression circuit 70, rather than as individual alternating bits. Therefore, data stored in memory circuit 62 may be processed at a different rate from data stored in memory circuit 64. As stereo or surround sound data is selected through multiplexer 68, decompression circuit 70 sends a control signal to memory control circuit 66 to decrement the appropriate pointer to update the amount of data currently stored in memory circuits 62 and 64.

In this fashion, decompression circuit 70 decompresses the audio data to provide a decompressed audio data stream at output 84. The decompressed audio data stream is applied to audio circuitry 72 for further processing such as decoding into the two stereo and three surround sound channels, converting to analog audio signals, amplifying, filtering and the like. The five-conductor output of audio circuitry 72 drives speaker 24 and/or other audio devices (not shown).

By now it should be appreciated that the present invention provides a circuit and method of interleaving a data stream in which the data to be interleaved is contained in separate sections of the data stream. A buffer storage circuit receives and stores the data stream. A first section of the data stream is transferred to a first memory circuit and a second section of the data stream is transferred to a second memory circuit. A multiplexer circuit having first and second inputs respectively coupled to the outputs of the first and second memory circuits selects between the first and second sections of the data stream in response to a selection signal to produce an interleaved output signal.

What is claimed is:

1. A circuit for interleaving a data stream, comprising:
    a buffer storage circuit having an input coupled for receiving and storing the data stream;
    a first memory circuit having an input coupled to an output of the buffer storage circuit for receiving a first section of the data stream;
    a second memory circuit having an input coupled to the output of the buffer storage circuit for receiving a second section of the data stream wherein the first and second sections of the data stream are representative of different channels of an audio signal, wherein the first memory circuit stores less than an entire frame of audio data and wherein the second memory circuit stores less than the entire frame of audio data; and
    a multiplexer circuit having first and second inputs respectively coupled to the outputs of the first and second memory circuits for selecting between the fit and second sections in response to a selection signal to provide an interleaved output signal at an output.

2. The circuit of claim 1, wherein the first and second sections of the data stream are formatted as an audio portion of Motion Picture Experts Group 2 (MPEG-2) data.

3. The circuit of claim 1, wherein the first memory circuit includes a dual port memory for providing stored data at the output of the first memory circuit while receiving and storing other data from the buffer storage circuit.

4. The circuit of claim 3, wherein the second memory circuit includes a dual port memory for providing stored data at the output of the second memory circuit while receiving and storing new data from the buffer storage circuit.

5. The circuit of claim 1, wherein the first memory circuit has a control input responsive to a first control signal for receiving first data from the buffer storage circuit after an amount of data stored in tile first memory circuit falls below a predetermined value.

6. The circuit of claim 5, wherein the second memory circuit has a control input responsive to a second control signal for receiving second data from the buffer storage circuit after an amount of data stored in the first memory circuit falls below a predetermined value.

7. The circuit of claim 6, further including a memory control circuit having first and second outputs coupled to control inputs of the first and second memory circuits for providing the first and second control signals, respectively.

8. A method of interleaving a data stream, comprising the steps of:

storing the data stream including storing data of the fast section of the data stream and data of the second section of the data stream in a third memory location;

copying a first section of file data stream to a first memory location;

copying a second section of the data stream to a second memory location;

selecting between the first and second memory locations to produce an interleaved output signal and selecting between data stored in the first memory location and data stored in the second memory location, wherein the step of selecting includes:

transferring data from the third memory location to the first memory location in response to a first control signal; and incrementing a first pointer representative of an amount of data stored in the first memory location;

decrementing the first pointer as data stored in the first memory location is selected; and generating the first control signal after the first pointer decrements to a first predetermined value.

9. The method of claim 8, wherein the step of selecting the second data includes the steps of:

transferring data from the third memory location to the second memory location in response to a second control signal; and incrementing a second pointer representative of an amount of data stored in the second memory location.

10. The method of claim 9, wherein the step of selecting the second data further includes the steps of:

decrementing the second pointer as data stored in the second memory location is selected; and generating the second control signal after the second pointer decrements to a second predetermined value.

\* \* \* \* \*

UNITED STATES PATENT AND TRADEMARK OFFICE
CERTIFICATE OF CORRECTION

| | | |
|---|---|---|
| PATENT NO. | : 6,895,596 B1 | Page 1 of 1 |
| APPLICATION NO. | : 08/997622 | |
| DATED | : May 17, 2005 | |
| INVENTOR(S) | : William E. Salzer | |

It is certified that error appears in the above-identified patent and that said Letters Patent is hereby corrected as shown below:

In Column 4, Line 46, Claim No. 1:

Change "second memory circuits for selecting between the fit" to --second memory circuits for selecting between the first--

In Column 4, Line 63, Claim No. 5:

Change "amount of data stored in tile first memory circuit" to --amount of data stored in the first memory circuit--

In Column 5, Line 10, Claim No. 8:

Change "storing the data stream including storing data of the fast" to --storing the data stream including storing data of the first--

Signed and Sealed this

Tenth Day of June, 2008

JON W. DUDAS
*Director of the United States Patent and Trademark Office*